2 Sheets--Sheet 1.
L. M. BATTY.
Harvesters.
No. 5,316. Reissued March 11, 1873.
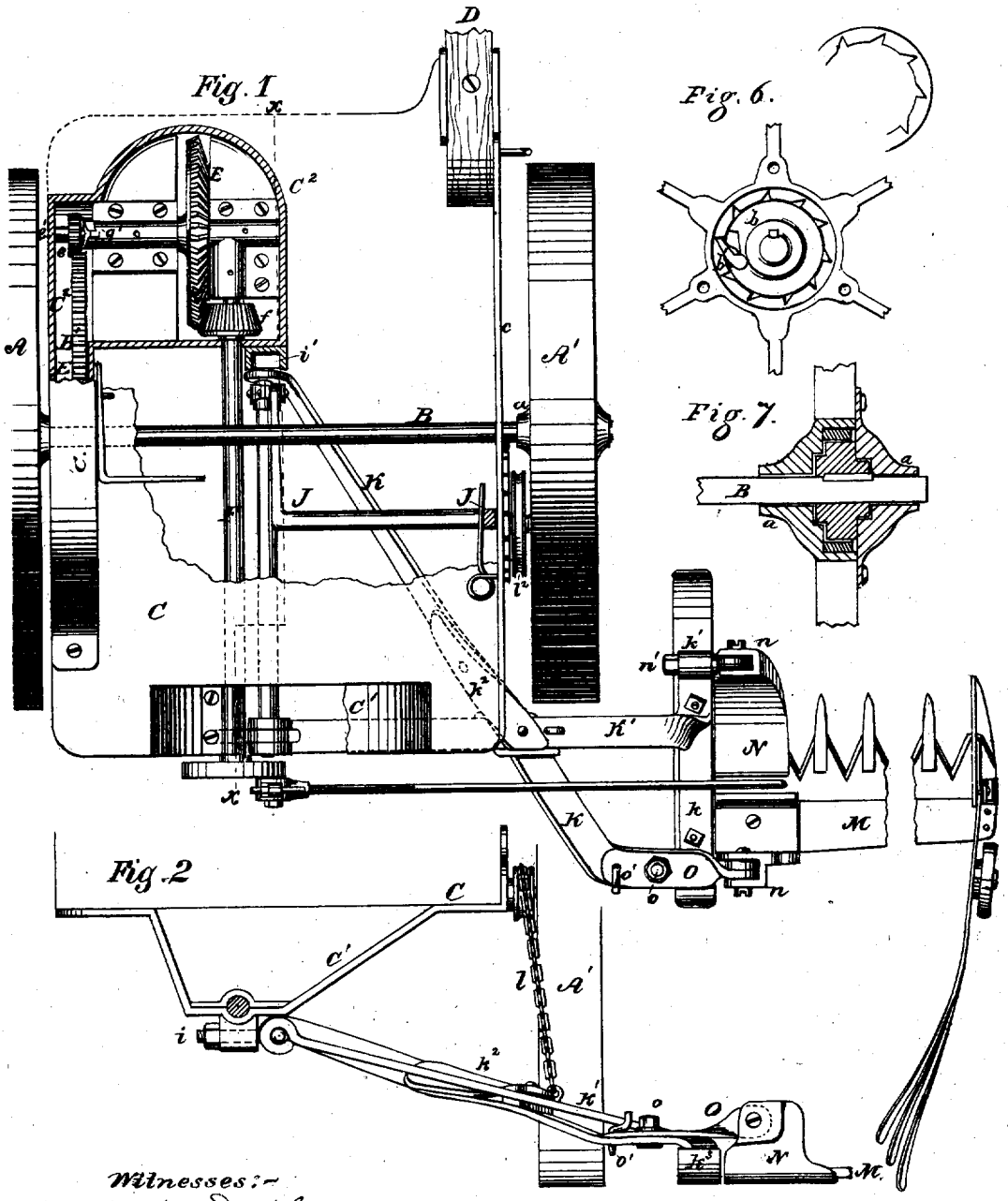
Witnesses:-
Baltis De Long.
Joel Peyton.
Inventor:- L. M. Batty
by his Atty
Wm D. Baldwin
A.M. PHOTO-LITHOGRAPHIC CO. N.Y. (OSBORNE'S PROCESS.)

2 Sheets--Sheet 2.
L. M. BATTY.
Harvesters.
Reissued March 11, 1873.
No. 5,316.
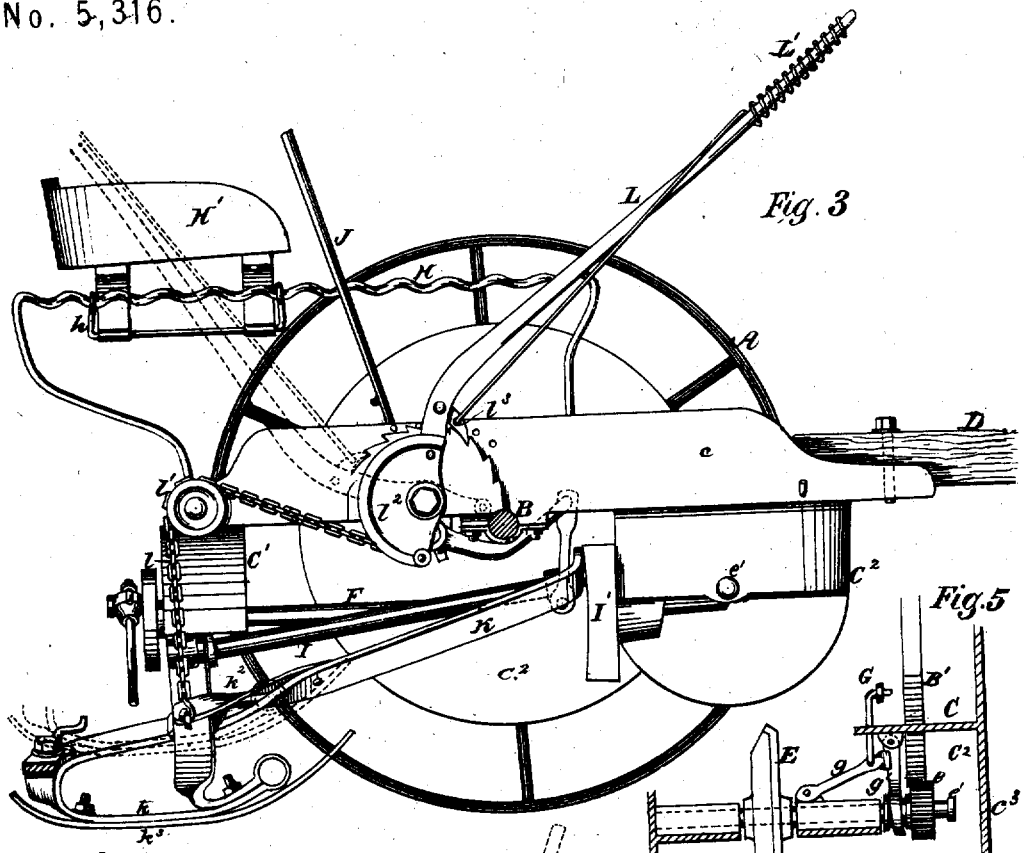
Fig. 3
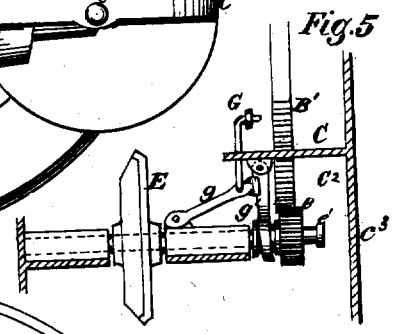
Fig. 5
Fig. 8.
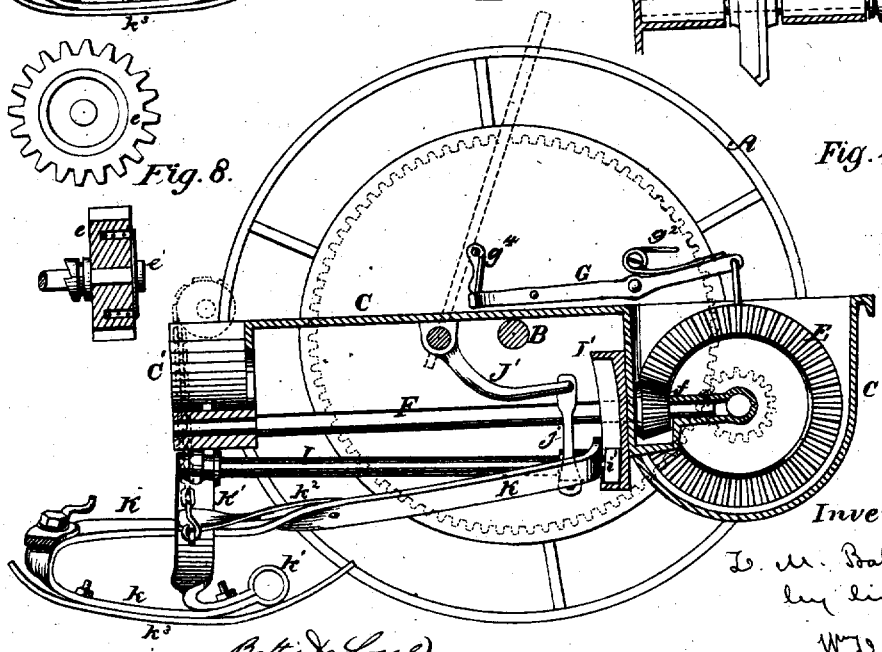
Fig. 4
Inventor:-
L. M. Batty
by his Atty
Wm D. Baldwin
Witnesses:
Battis & Long
Joe S. Peyton
AM. PHOTO-LITHOGRAPHIC CO. N.Y. (OSBORNE'S PROCESS)

UNITED STATES PATENT OFFICE.

LINDLEY M. BATTY, OF CANTON, OHIO, ASSIGNOR TO WILLIAM K. MILLER, OF SAME PLACE.

IMPROVEMENT IN HARVESTERS.

Specification forming part of Letters Patent No. 111,424, dated January 31, 1871; reissue No. 5,316, dated March 11, 1873.

*To all whom it may concern:*

Be it known that I, LINDLEY M. BATTY, of Canton, in the county of Stark and State of Ohio, have invented certain new and useful Improvements in Harvesters, of which the following is a specification:

The first part of my invention relates to that class of machines having a metal frame. Its object is to secure a strong, light, and rigid frame, and to protect the gearing from dust and dirt, to which end the improvement consists, first, in constructing the main frame of a harvester of a metal base-plate having a down-hanger cast at one end for the journal of the crank-shaft and a cavity for the gearing on one side, (the walls of said cavity being either entirely cast or having one side of sheet metal,) and all the bearings of the gearing being cast with the base-plate and the gearing completely inclosed by suitable coverings combined with the base-plate, as hereinafter more fully set forth. Second, the next part of my invention relates to machines having backing-ratchets. Its object is to afford additional bearing-surface for the main axle, to lessen the danger of splitting the hub by strains on the driving-wheel, to which end my improvement consists in combining a driving-wheel having notches on the interior of its hub at such distances apart as to leave from one-fourth to one-half of its surface unnotched, and a pawl-wheel fitting in said hub with its rim bearing against said unnotched portions, as hereinafter more fully set forth. Third, the next part of my invention relates to the gearing. Its object is to guard against injury to the driver and to enable him to throw the mechanism into or out of gear, which objects I attain by combining with the gearing mechanism by which the driver keeps the machine in gear by bearing with his foot upon a treadle, the gearing being at once disconnected by the removal of his foot from the treadle, as hereinafter more fully set forth. Fourth, the next part of my invention relates to the lifting-lever. Its object is to obtain a cheap, simple, and efficient device by which the driver can simultaneously operate the lifting-lever and its locking-pawl, to which end the improvement consists in combining with the lifting-lever a coiled-wire handle connected with the locking-pawl, as hereinafter more fully set forth. Fifth, the next part of my invention relates to that class of hinge-joint harvesters having a double-hinged coupling-frame rocking in its connections with the main frame to regulate the pitch of the guards and secure a compact arrangement of mechanism; and the improvement consists in combining, with the main frame of a harvester, a coupling-frame pivoted on a longitudinal axis between the driving-wheels, and having suitable rocking mechanism, as hereinafter more fully set forth. Sixth, the next part of my invention relates to the construction of the coupling-frame. Its object is to make said frame light but rigid; to which end the improvement consists in constructing the coupling-frame of a single bar of wrought metal having its ends bent so as to cross each other, and being firmly secured together at their joint of junction, as hereinafter more fully set forth. Seventh, the next part of my invention relates to the hinge-connections between the coupling-frame and shoe. Its object is to enable the finger-beam not only to rise and fall at either end, but to fold up and be turned around parallel to the face of the driving-wheels for convenience in transportation, to which end the improvement consists in combining the inner shoe with the coupling-frame by a swiveling-joint at one end and an intermediate arm at the other, pivoted to the shoe and secured to the coupling-frame by a detachable connection, as hereinafter more fully set forth. Eighth, my invention further consists in combining a main frame, a vibrating coupling-frame hinged thereto, a guard-shoe secured to said coupling-frame, and an inner shoe (carrying the finger-beam) hinged to the guard-shoe.

In the accompanying drawing, all my improvements are represented as embodied in one machine; obviously, however, some of them may be used without the others, and in machines differing somewhat in construction from the one shown.

Figure 1 represents a plan or top view of so much of my improved machine as is necessary to illustrate the subject-matter herein claimed, the driver's support being removed and the casing broken away to show the mechanism beneath; Fig. 2, a rear elevation of portions of the machine; Fig. 3, a side elevation of the machine; Fig. 4, a vertical longitudinal section through the frame on the line *x x* of Fig. 1; Fig. 5, a detail of the clutch mechanism; Figs. 6 and 7, views of the ratchet-hub; and Fig. 8, a side view of, and transverse section through, the sliding spur-pinion on the counter-shaft.

Two main driving-wheels, A A′, are shown as turning freely on a main axle, B, with which they are connected by backing ratchets, hereinafter described. The main axle in turn revolves in bearings in the main frame, which consists of a base-plate, C, having a stirrup or downhanger, $C^1$, at one end for the journals of the crank-shaft and coupling-arm pivots. A chamber, $C^2$, Fig. 1, having two compartments, is formed in the base-plate, near its outer front corner, and at the adjacent side thereof, and may either be cast in one piece with the base-plate, or it may have a removable side, $C^3$, fitting in a groove in the base-plate. A flange, *c*, on the inner side of the base-plate, serves as a shield for the driver, and as a strengthening rib or brace for the frame. The front part of this flange also forms one side of a socket for the tongue D. Bearings for the main axle may be cast in either the upper or lower side of the base-plate. A spur-wheel, B′, fast on the main axle, drives a corresponding pinion, *e*, on a counter-shaft, *e′*, mounted in bearings in the chamber in the base-plate, and carrying a bevel-gear, E, which drives a pinion, *f*, on a crank-shaft, F, which drives the cutters in the usual well-known way.

The gear-chamber $C^2$, it will be observed, is in two compartments, the one inclosing the main spur-wheel being partly above the frame, while the other (inclosing the bevel-gearing) is entirely below it. These compartments are inclosed by sliding or hinged covers of well-known construction. The gearing is thus protected, and, being mainly below the base-plate, leaves the platform of the main frame unobstructed.

The advantages of having all the bearings in a rigid metal frame, instead of mounting them in a yielding wooden one, are obvious; and metal frames have been much used in consequence.

The construction of the frame may be modified to suit various classes of machines, such as front or rear cut, or double-speed gearing, as is well understood.

The mechanism is thrown into or out of gear by means of a treadle, G, acting on a lever, *g*, pivoted on the box of the counter-shaft, and bearing on a forked shipper, $g^1$, pivoted underneath the base-plate and sliding the second spur-pinion *e* endwise. (See Figs. 4 and 5.) A spring in the spur-pinion tends to keep it in gear by bearing against a shoulder, *e′*, on the counter-shaft. (See Fig. 8.) A spring, $g^2$, tends to keep the mechanism out of gear by bearing down on the treadle. Consequently, to keep it in gear, the driver must either keep his foot on the treadle or fasten it down with a button, $g^4$, on the frame. When not thus fastened, should the driver be thrown from his seat the gearing would stop, and thus avoid the danger of injury from the cutters working.

The driving-wheel hubs (see Figs. 6 and 7,) form long pipe-boxes *a*, ratchet-notches being formed in the inner surface thereof. A pawl-wheel, *b*, keyed on the main axle, fits snugly in each hub, but allows the hubs to turn freely. Pawls *b′*, pivoted in recesses in the pawl-wheels, are forced outward by springs, which tend to keep the pawl in the ratchet-notches when moving forward.

The operation of the device is obvious. As the notches occupy less than one-half of the inner surface of the hub it is obvious that a large bearing-surface between the hub and pawl-wheel will be secured, thus preventing wearing or danger of splitting the wheel.

A frame, composed of bent corrugated rods H, mounted on the frame, supports the driver's seat H′ by means of links *h*, hooked on the rods and pivoted to the seat-standards. By this means an easy swinging motion is given to the seat, and it can readily be moved backward or forward to adjust it and retain itself in position without being fastened by the hooks catching in the corrugations of the supporting-rods.

The coupling-frame K K′ for a rear-cut machine consists of a continuous bar of metal, bent in the manner shown in the drawing. A brace-rod, I, pivoted in a swiveling socket, *i*, on the down-hanger $C^1$, extends in front of the main axle, and carries at its forward end a block, *i′*, moving vertically in a guide, I′, underneath the base-plate and central, or substantially so, between the wheels. A link, *j*, connects this brace-rod with the cranked rock-shaft J′, operated by a hand-lever, J, controlled by a suitable detent. A drag-bar, K, pivoted on the front end of the brace-rod I, with its edge vertical, extends diagonally outward and backward to a point behind and outside of the inner driving-wheel A′, being twisted until it lies flat. It is then bent downward, and carried forward to form the sole *k* of the guard-shoe. The front end of this shoe is rounded to form a socket, $k^1$. The bar is then doubled back on itself to stiffen the sole of the shoe; twisted, bent upward, and forms the coupling-arm K′, being pivoted to the swiveling socket *i*, riveted to the drag-bar at their intersection, and the junction strengthened by a stiffening-plate, $k^2$. An extra runner, $k^3$, is secured to the under side of the shoe to give it the requisite strength and stiffness.

The coupling-frame, it will be seen, is rocked by the lever J above described. It is raised or lowered by means of a chain, *l*, passing over a pulley, $l^1$, on the frame, and attached to a rocking sector, $l^2$, pivoted on the frame, and controlled by a hand-lever, L. A coiled-wire handle, $L^1$, on the lever is connected with a pawl, $l^3$; also pivoted on the handle, acting on a sector-rack of ordinary construction to hold the coupling-frame at any desired elevation.

The driver can easily lift the pawl by grasping the handle and with the same motion that operates the lever. A finger-beam, M, having the usual cutting apparatus, is secured at its heel end to a shoe, N, having lugs or sockets *n* on its heel and toe. A pin, *n'*, turning in the front socket of the guard-shoe *k*, is pivoted to the toe of the shoe N. A short bar, O, is pivoted to the rear lug of the shoe N, and turned flatwise so as to lie upon the coupling-arm, to which it is connected by a bolt, *o*, and by a screw, *o'*, having a crank-handle, to admit of its being readily removed or replaced.

The operation of the machine will be obvious from the foregoing description. The finger-beam can rise or fall freely at either or both ends without affecting the movements of the main frame. It can likewise be raised or lowered to pass obstructions or to regulate the height of cut, and can be rocked to regulate the pitch of the guards by the rocking lever. The finger-beam can be folded directly up against the main frame; or, by removing the rear hinge connections, it may be rocked on its front hinge and turned parallel with the face of the driving-wheel. By removing the front hinge and the crank-screw the cutting apparatus may be swung round horizontally parallel to the path of the machine, and thus be carried from field to field when a grain-wheel is used.

I claim as my invention—

1. The main frame, constructed as set forth, and consisting of the metal base-plate having the down-hanger cast at one end, the gear-chambers and casing at the side and near the outer corner thereof, and bearings for the journals, as described.

2. The combination of the driving-wheel hubs, notched intermittently to leave a bearing-surface on their interior, with the pawl-wheels fitting in said hubs, and carrying spring-pawls taking into the ratchet-notches, as described.

3. The combination of the spring-pinion sliding on the counter-shaft, the swinging shipper, the lever pivoted on the box of the counter-shaft, and acting upon the swinging shipper, the link, the treadle and its spring, all these members being constructed and operating in combination, as set forth, to throw the mechanism out of gear whenever the driver releases the treadle.

4. The combination of the lifting-lever, its pawl, and the coiled-wire handle connected directly with the pawl, substantially as set forth, to enable the driver to release the pawl and move the handle by a single motion.

5. The combination, with the main frame, of the coupling-frame rocking on a longitudinal axis between the wheels, and pivoted to the main frame at one end by a swivel-joint and at the other by a sliding connection, these members being constructed and operating in combination, as and for the purposes set forth.

6. The coupling-frame, construsted as set forth, of a continuous bar, which also constitutes the guard-shoe.

7. The combination of the coupling-frame, the guard-shoe, the inner shoe of the finger-beam, the swivel-pin connecting the two shoes and the intermediate arm pivoted to the inner shoe and upon the coupling-frame, these members being constructed and operating substantially as set forth, to permit the folding of the finger-beam.

8. The combination in a harvester, of a main frame, a hinged coupling-frame pivoted to said main frame, a guard-shoe attached to the coupling-frame, and a shoe carrying the inner end of the finger-beam pivoted to the coupling-frame, substantially as set forth, to allow the inner shoe to vibrate independently of the guard-shoe.

LINDLEY M. BATTY.

Witnesses:

PLIMPTON BALL,

W. B. GREENWOOD.